United States Patent
Kilian

(10) Patent No.: US 8,172,211 B2
(45) Date of Patent: May 8, 2012

(54) WORK RESTS FOR SUPPORTING A WORKPIECE IN A MACHINING UNIT AND MACHINING UNITS CONTAINING SUCH WORK RESTS

(75) Inventor: Friedrich Kilian, Leonberg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 416 days.

(21) Appl. No.: 12/276,557

(22) Filed: Nov. 24, 2008

(65) Prior Publication Data
US 2009/0127762 A1    May 21, 2009

Related U.S. Application Data

(63) Continuation of application No. PCT/EP2006/004985, filed on May 24, 2006.

(51) Int. Cl.
*B23Q 3/00* (2006.01)
*B23K 26/02* (2006.01)

(52) U.S. Cl. .................... 269/296; 219/121.82

(58) Field of Classification Search .................. 269/296, 269/266, 89, 265, 900; 219/121.82; 156/272.8; 83/104, 167
See application file for complete search history.

(56) References Cited

U.S. PATENT DOCUMENTS

| | | | |
|---|---|---|---|
| 3,944,203 A | 3/1976 | Brekelbaum | |
| 4,097,713 A | 6/1978 | Dunshee | |
| 4,121,816 A * | 10/1978 | Eads | 269/296 |
| 4,200,272 A * | 4/1980 | Godding | 269/26 |
| 6,068,547 A * | 5/2000 | Lupi | 451/388 |
| 6,497,403 B2 * | 12/2002 | Ries | 269/266 |

FOREIGN PATENT DOCUMENTS

| | | |
|---|---|---|
| DE | 3803918 | 8/1989 |
| JP | 59127988 | 7/1984 |
| JP | 8132228 | 5/1996 |
| JP | 2001259878 | 9/2001 |
| JP | 2004330268 | 11/2004 |

OTHER PUBLICATIONS

International Preliminary Report on Patentability from corresponding PCT Application No. PCT/EP2006/004985, mailed Feb. 9, 2009, 6 pages.
International Search Report from corresponding PCT Application No. PCT/EP2006/004985, mailed Feb. 8, 2007, 2 pages.

* cited by examiner

*Primary Examiner* — Lee D Wilson
*Assistant Examiner* — Jamal Daniel
(74) *Attorney, Agent, or Firm* — Fish & Richardson P.C.

(57) ABSTRACT

Workpiece rests are disclosed, for holding workpieces in machining systems which machine the workpieces using a cutting beam, e.g., a laser beam. A workpiece rest includes a frame, a plurality of rest elements which are arranged adjacent to one another in the frame so as to support the workpiece, and a supporting element attached to at least one of the rest elements.

11 Claims, 4 Drawing Sheets

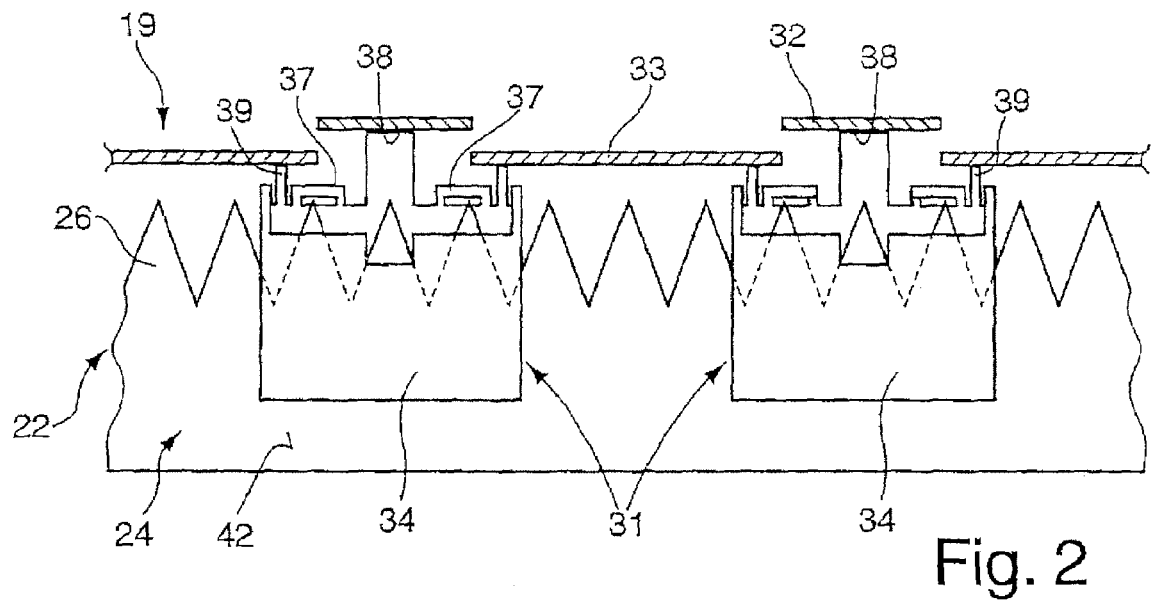
Fig. 2
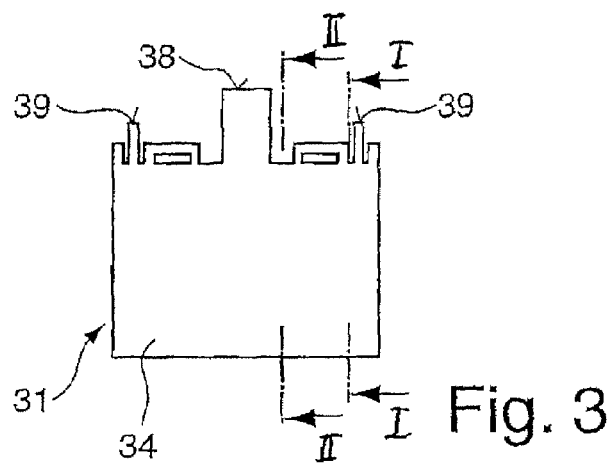
Fig. 3
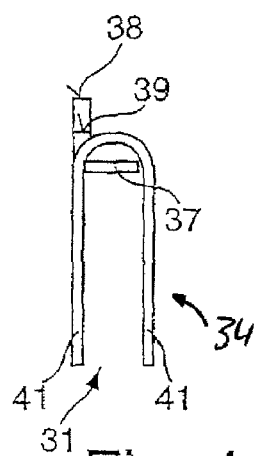 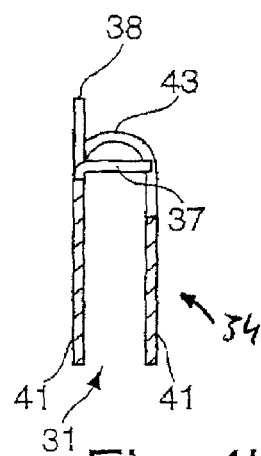 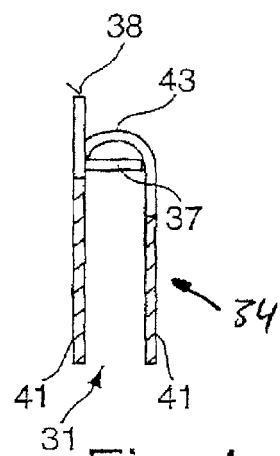
Fig. 4a    Fig. 4b    Fig. 4c

WORK RESTS FOR SUPPORTING A WORKPIECE IN A MACHINING UNIT AND MACHINING UNITS CONTAINING SUCH WORK RESTS

CROSS-REFERENCE TO RELATED APPLICATIONS

This application is a continuation application of and claims priority under 35 U.S.C. §120 to PCT Application No. PCT/EP2006/004985, filed on May 24, 2006. The contents of that priority application are hereby incorporated by reference in their entirety.

TECHNICAL FIELD

The invention relates to a workpiece rest for holding a workpiece, e.g., a plate-like workpiece, in a machining system which machines the workpiece using a cutting beam, e.g., a laser beam.

BACKGROUND

To machine workpieces, for instance plate-like workpieces such as sheet metal, in laser machining systems, a workpiece rest is generally provided. The workpiece rest may, for example, include a frame with a plurality of rest elements which are arranged generally parallel to one another and on which the workpiece to be machined rests. The rest elements usually have supporting point peaks at regular intervals and form a rest field for the workpiece(s).

Laser machining systems of this type comprise a laser cutting head which is movable relative to the workpiece rest in order to machine a substantially stationary workpiece, which rests on the supporting point peaks of the rest elements, by means of a laser beam. During the machining, problems occur as the laser beam passes over the supporting point peaks, such as for example damage to the supporting point peaks as a result of welding deposits, damage to the supporting point peaks as a result of their being melted away, and/or a non-uniform cut between the product part and the residual part, since the cutting conditions at the supporting point peaks are different from those at the adjacent supporting point peaks.

In order to reduce the above-stated problems in the machining of the workpieces, DE 38 03 918 A1 describes a workpiece rest in which the rest elements can be lowered as a function of the position of the laser beam during the machining process. A mechanism which is coupled to the cutting head serves to lower in each case that rest element which is situated in the impingement region of the laser beam during the machining process.

A similar design is likewise known from JP 59127988 A. The rest strips are activated by means of a cam guide, with a lowering movement and a displacement movement in the longitudinal direction of the rest element being provided simultaneously.

In both of the above-described workpiece rests, a lowering of the supporting point peaks is effected over the entire length of the rest elements, reducing weld deposits on the supporting point peaks as they are traversed during the cutting process. However, non-uniform cuts may still occur, in particular when a workpiece is almost completely cut out from the workpiece table and rests with one end on the lowered supporting point peaks.

JP 2001-259878 A2 describes a laser machining system for producing electronic printed circuit boards, in which uniform bore diameters and bore shapes are required. A printed circuit board of this type rests, for machining, on a workpiece rest. In order that machining can take place in a manner not influenced by the workpiece rest, the workpiece rest has a series of parallel depressions which are arranged adjacent to one another and in which rest peaks are provided so as to be longitudinally movable. Said rest peaks are moved as a function of the machine data for producing the printed circuit boards, thereby making uninfluenced machining possible. However, during the machining process, burned-off portions, slag and dust which are deposited, and the chips which are generated during the production of bores, may contaminate or block the guides of the rest peaks, and can therefore result in the workpiece rest becoming non-operational. Handling tends to be impaired on account of the high cleaning expenditure. Furthermore, during the machining of printed circuit boards, there is not the problem that, after the machining process, a separate product part and residual part is present, with it being necessary for the product part and also the residual part to be reliably held by the rest elements until the complete unloading of the workpiece rest.

SUMMARY

Workpiece rests are disclosed herein in which the rest elements have a long service life and the separate product parts and residual parts are reliably held.

In one aspect, the invention features a workpiece rest for supporting a workpiece in a machining system which machines the workpiece using a cutting beam. The workpiece rest comprises a frame, a plurality of rest elements which are arranged adjacent to one another in the frame so as to support the workpiece, and a supporting element attached to at least one of the rest elements.

In some implementations, the workpiece rest comprises a plurality of supporting elements, each of which is attached to one of the rest elements.

Before it is loaded with one or more workpieces, the workpiece rest is prepared for the impending machining process by attaching one or more supporting elements to one or more of the rest elements. The supporting elements may be positioned so as to provide adequate support as a function of the overlapping of the product parts in a workpiece.

Some implementations include one or more of the following features. Each supporting element has at least one rest surface on which the product part and/or the residual part rests. The supporting elements are attached to the rest element(s) in such a way that the cutting contours run adjacent to the rest surface of the supporting element for the product part. At the same time, the supporting elements are positioned with respect to one another on the rest element of the workpiece rest in such a way as to enable the product part(s) to be securely held after the cutting process. By means of the attachment of the supporting elements as a function of the overlapping cutting process of the plate-like workpiece to be machined, a durable workpiece rest is created since a direct traversing of the rest elements by the cutting beam is prevented and the rest elements are protected by the at least one supporting element. Furthermore, it is generally possible for damage to the workpiece to be machined as a result of welding deposits or reflections during the cutting process to be prevented.

In one advantageous refinement of the workpiece rest, the supporting elements are pluggable onto the rest element and are in particular provided so as to be movable along the rest element. As a result of said pluggable arrangement of the supporting elements, simple attachment is made possible, which is carried out within a short time without additional auxiliary means for the fastening thereof. As a result of the movability of the supporting element(s) along the rest element, precise positioning is made possible with regard to the overlapping of the subsequent machining program.

According to one preferred embodiment of the workpiece rest, the rest element is provided with a corrugated or sawtooth-shaped structure to which the supporting element is attachable, so as to be prevented from moving. It is therefore possible to ensure, after setting the position of the supporting element, that an inadvertent displacement or movement of the supporting element as a result of the loading and unloading of the workpiece rest is prevented. Such a sawtooth-shaped, tooth-shaped or corrugated structure may also permit sufficiently fine adjustment of the position.

It may alternatively be provided that the rest element comprises a rectilinear, preferably horizontal section or a plurality of rectilinear sections which are separated from one another, for example by means of a small depression. In particular, a continuous, horizontally aligned section permits a simple geometry of the rest elements, which permits stepless or gridless positioning of the rest elements.

According to a first preferred embodiment, one supporting element comprises at least one rest peak or rest surface for a product part and is a product-part supporting element, and a further supporting element has at least one rest peak or rest surface for a residual part and is a residual-part supporting element. Preferably, the rest surface or peak of the product part is arranged at a higher level than that of the residual part. In this way, it is made possible that, after the machining process is complete, the product parts are held at a higher level than the residual part(s). This permits simplified removal of the product parts and subsequently of the residual parts. A quick visual check of the machining status is also made possible.

According to an alternative embodiment, the supporting element has a rest peak or rest surface for a product part and, at least adjacent thereto, a rest peak or rest surface for a residual part, with the rest surface of the product part being provided at a higher level than that of the residual part. Said arrangement makes it possible for both the cut edge region of the residual part and also that of the product part to assume a defined rest position.

It is preferably provided that a height difference between the rest surface of the product part and the rest surface of the residual part is greater than a thickness of the plate-shaped material. In this way, after the cutting process, a precise separation between the product part and residual part can take place and a seizing of the parts with respect to one another can be prevented.

In a further advantageous embodiment, the rest surface of the product part or that of the residual part is of electrically insulating design. In this way, it is possible to detect, by measuring an electric potential difference, whether the product parts have been completely cut away from the residual part(s).

In some implementations, the supporting element is formed in one piece as a cut and bent part or as a punched and bent part. This permits simplified production, such that new supporting elements can in some cases be produced by means of the machining system itself.

The supporting elements are preferably placed onto the rest elements by means of a handling device, with the positioning of the supporting elements being selected taking into consideration the overlapping of the subsequent machining process. Here, the cutting contour of the overlapping is taken into consideration, in order that the rest surfaces of the supporting elements for the product part and residual part do not lie in the traversed region, but rather the product part and residual part lie at an elevated level with respect to the rest elements in order to prevent damage to the rest elements as the cutting beam passes over, or to protect the rest elements by the supporting element in the region traversed by the cutting beam. Furthermore, as a function of the geometry of the product parts, at least three-point support is defined in order to provide a secure hold.

According to a first embodiment of the invention, the supporting elements comprise a U-shaped cross section, which is open in the downward direction, with at least one supporting point peak which is provided on the rest element being covered by the supporting element. The supporting element preferably rests simultaneously on the at least one supporting point peak. In this way, the supporting element can provide protection of the underlying supporting point peak. Furthermore, the U-shaped cross section has the advantage that simple application to, removal from, and displacement along the rest element is made possible.

The limbs of the supporting element are preferably positioned with respect to one another so as to bear with at least a slight preload against the side surfaces of the rest element. At least a slight clamping action is obtained in order to permit secure positioning, with a low-vibration or vibration-free arrangement of the supporting elements on the rest elements being provided.

According to a further advantageous refinement of the first embodiment of the supporting elements, a protective section is provided adjacent to the rest surface of the product part or between a rest surface of the product part and a rest surface of the residual part, which protective section covers at least one supporting point peak. Said protective section lies below the cutting gap in the cutting contour. In this way, the rest element and the at least one underlying supporting point peak are protected. Furthermore, it is preferably provided that said protective section is at least slightly inclined with respect to a rest surface of the workpiece. In this way, back-spatter or reflections during the cutting machining process can be reduced, such that the underside of the product part also has a high-quality surface.

In an alternative embodiment, the supporting element engages with a first and a second fastening section on a rest element which comprises a protective strip which is inclined with respect to the rest plane of the workpiece, which protective strip at least partially covers a retaining strip as the cutting beam passes over. In this way, it is made possible for the retaining strip to be free from slag and other influences as a result of melting or material spatter or the like, such that a system, or engagement surface for the supporting element, which is insusceptible to contamination is provided for secure positioning.

The retaining strip is preferably arranged in a V-shape with respect to the protective strip, with the protective strip being provided between the workpiece and the retaining strip. The retaining strip subsequently merges into a vertically aligned rest strip which is preferably fastened to the frame of a workpiece rest and which is in particular supported by support struts which are arranged at right angles with respect to said frame.

In the above-described embodiment, the supporting element can have a first fastening section, for example legs, which are supported at least on the retaining strip and which in particular partially engage behind said retaining strip, and a further fastening section, for example arms, which engage on a side, which faces away from the workpiece, of the protective strip. In this way, it is made possible that the arms and legs of the supporting element engage in each case on rest surfaces which are insusceptible to dirt. In this way, it is possible to ensure that the rest surfaces of the supporting elements which are positioned on the rest element lie in a uniform contact plane, such that uniform operating conditions and a precise alignment of the workpiece on the workpiece rest are made possible.

The rest elements for holding the supporting elements preferably have, between the protective strip and the retaining strip, cutouts into which the legs at least partially engage. As a result of said arrangement of the covering protective strip, the legs engage in a protected manner on the retaining strip, such that, during the cutting process, a fusion of the legs to the rest element, or baking of the legs onto the rest element, by the cutting beam which acts from above, or by the slag, sparks and other spatter, is prevented. The same applies to the arms which bear in a supporting manner against the underside of the protective strip.

For the fixing, and vibration-free holding, of the alternative embodiment of the supporting elements, a spring element can be provided on an underside of the protective strip, which spring element secures the supporting element in a retaining position after the positioning with respect to the rest element, in particular with respect to the retaining strip. This can also provide increased process reliability during the loading and unloading of the workpiece or of the product parts and residual parts.

To increase the machining quality of a surface of the workpiece which is aligned toward the rest element, on the supporting element, all the free end surfaces which point in the direction of the workpiece can be inclined with respect to a rest plane of the workpiece. In this way, adverse effects as a result of reflections can be considerably reduced.

The alternative embodiment of the supporting element preferably has a V-shaped design, or a design similar to this, as viewed in plan view. In this way, simple assembly and disassembly can be provided by means of the design of the arms and legs. Furthermore, it is possible to use a relatively thin bent sheet-metal part which can absorb high loads.

The details of one or more embodiments of the invention are set forth in the accompanying drawings and the description below. Other features and advantages of the invention will be apparent from the description and drawings, and from the claims.

BRIEF DESCRIPTION OF DRAWINGS

FIG. 2 shows a schematic side view of a rest element with supporting elements arranged thereon.

FIG. 3 shows a rear view of the supporting elements as per FIG. 2.

FIG. 4a to c show schematic side views of the supporting element as per FIG. 3.

Like reference symbols in the various drawings indicate like elements.

DETAILED DESCRIPTION

Figure 1:
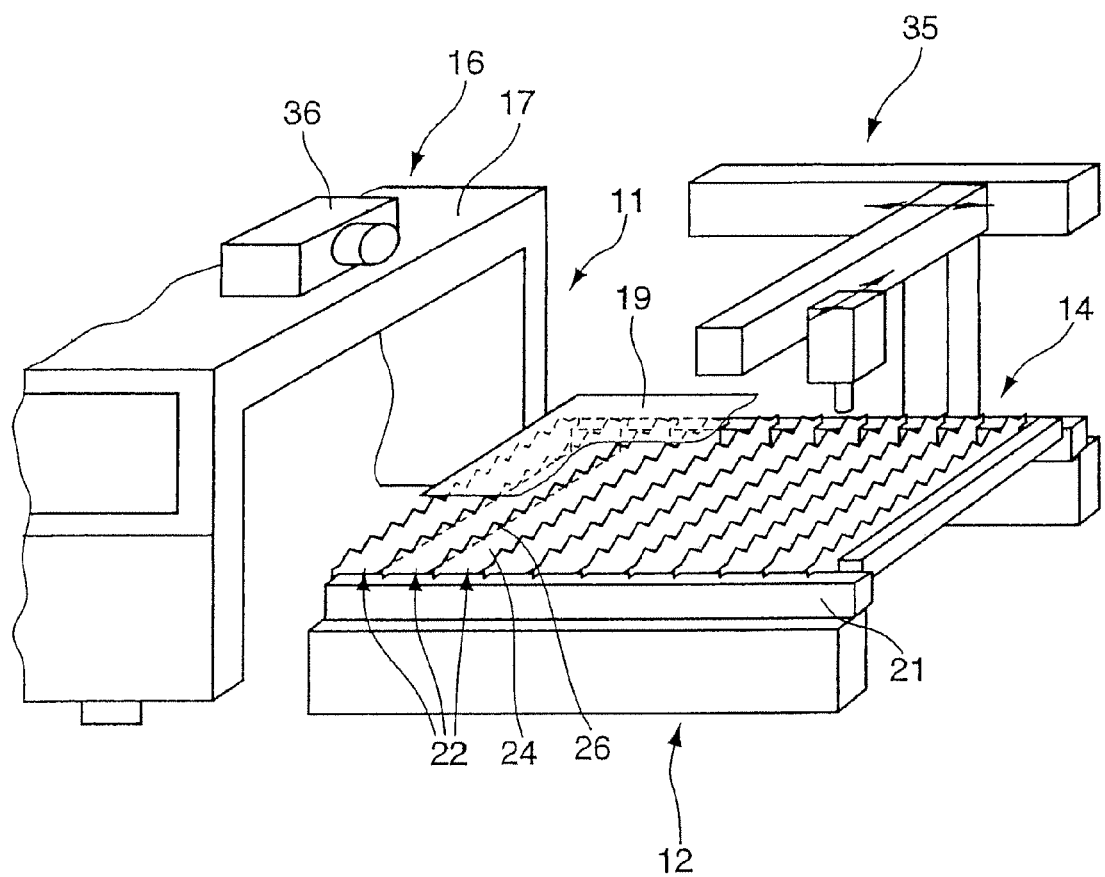
FIG. 1 is a perspective illustration of a machining system.

FIG. 1 shows a perspective partial view of a machining system 11, in particular a laser machining system. A workpiece rest 14 which is arranged in a loading and unloading region 12 is provided for traveling into a machining machine, in particular laser machining machine 16, of which a housing 17 is partially illustrated. In said laser machine, a cutting head is moved, by means of a linear system (not illustrated in any more detail), above a workpiece 19, which rests on the workpiece rest 14, in order to form a cutting contour.

The workpiece rest 14 is composed of a frame 21 which holds a plurality of rest elements 22 which are arranged adjacent to one another. In a first exemplary embodiment, the rest elements 22 comprise a rest strip 24 and, arranged above the latter, supporting point peaks 26 which comprise a rest peak which tapers to a point.

FIG. 2 shows a schematic side view of a first embodiment of a rest element 22 with supporting elements 31 which are arranged thereon and which hold the workpiece 19. After the machining process, on account of the cutting process, the workpiece 19 is divided into a product part 32 and a residual part 33.

The supporting element 31 comprises a U-shaped body 34 (FIG. 4a) which is open in cross section in the downward direction and is plugged onto the rest element 22 and which, in the exemplary embodiment, engages over three supporting point peaks 26 and covers two supporting point peaks 26. For this purpose, protective sections 37 are provided which simultaneously serve as a stop or rest surface of the supporting element 31 on the supporting point peaks 26. Provided adjacent to the protective section 37 is a rest surface 38 for the product part 32, which is arranged at an elevated level with respect to a rest surface 39 of the residual part 33. After the cutting of the workpiece 19, the residual part 33 falls in relation to the product part 32, thereby making visual monitoring possible since the product parts 32 are situated at a high level and the residual parts 33 are situated at a low level, and are simultaneously separated in this way.

The supporting elements 31 are positioned by being simply plugged onto the rest element 22. The supporting element 31 engages with its limbs 41 on side surfaces 42 of the rest element 22 and is thereby fixed. This permits a low-vibration or vibration-free arrangement. The supporting elements 31 may also, on account of this design, be provided so as to be movable in the longitudinal direction along the rest elements 22. For positive fixing in terms of position, it may be provided that the supporting elements 31, in particular the protective sections 37, have a contour, which contours engage on the supporting point peaks 26 and can be moved, at predefined spacings, into adjacent positions.

The section lines I and II illustrated in FIG. 3 are shown in the illustrations of FIG. 4b and FIG. 4c, and FIG. 4a shows a side view of FIG. 3. Said illustrations clearly show the design of the supporting element 31 as a punched and bent part or as a cut and bent part, which is preferably produced from one piece. The two limbs 41, which run parallel to one another, of the supporting element 31 are connected to one another by means of a connecting web or hoop 43. The free distance between the limbs 41 can, by means of the degree of bending, be provided so as to be smaller than the width of the rest element 22, such that, after the supporting element 31 is placed onto the rest element 22, the limbs 41 bear in a clamped fashion with an at least slight force loading. The protective section 37 is provided by means of an angled portion on one of the limbs 41 at 90° with respect to the limb 41 or preferably at less than 90°. The rest surfaces 38 and 39 are formed as an elongation of one limb 41. Said exemplary arrangement of a supporting element 31 as per FIGS. 2, 3 and 4a to c permits a cost-effective design.

Figure 5:
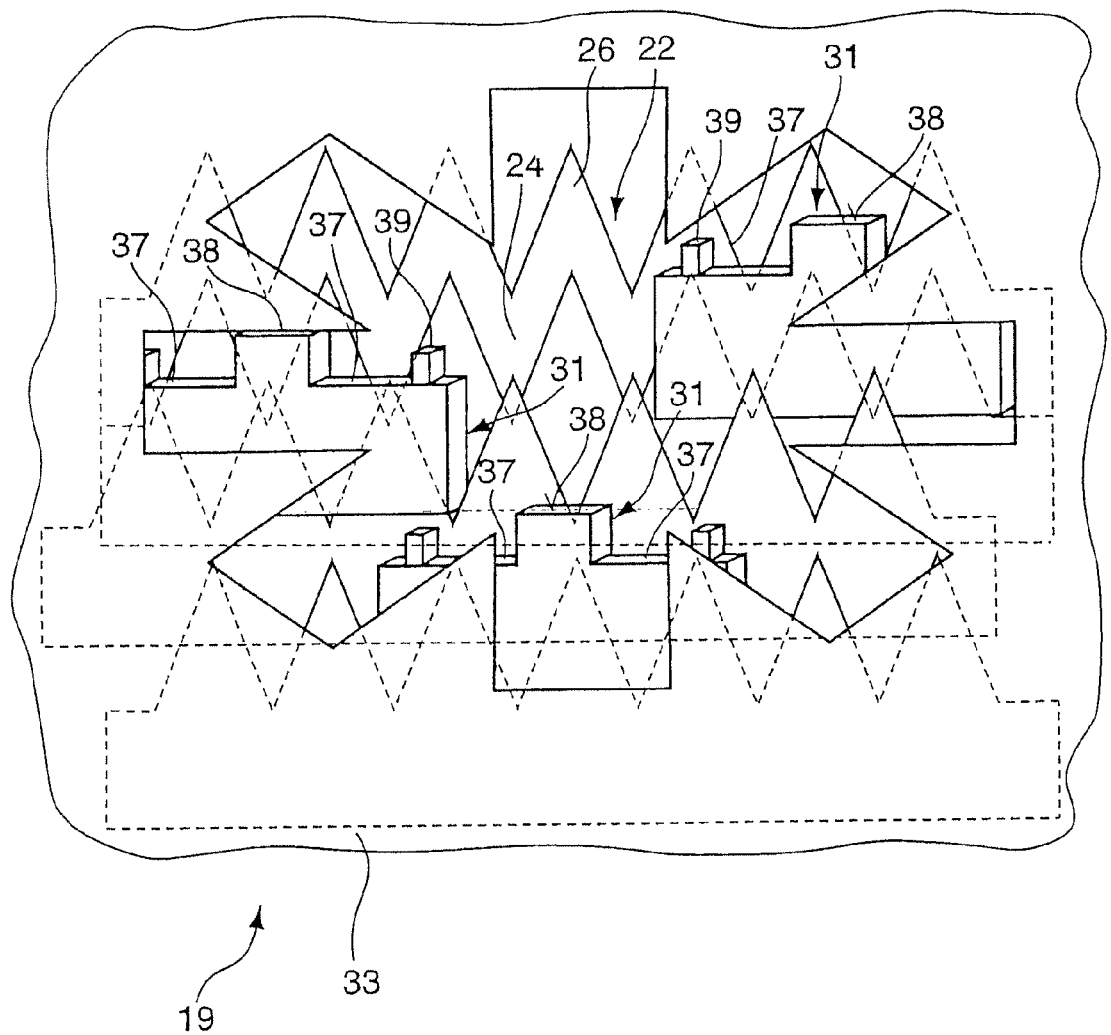
FIG. 5 is a perspective illustration of a cutout from a machined workpiece which is resting on the workpiece rest.

FIG. 5 is a perspective illustration of a workpiece 19 after the cutting process, with the product part not being illustrated for the purpose of clarity, said product part otherwise resting, at a higher level than the residual part 33, on the rest surfaces 38 of the supporting elements 31. The supporting elements 31 are positioned, as a function of the provided overlapping for the cutting process, in such a way as to provide for example three-point support for the product part, as can be seen from FIG. 5. This provides secure support for the product part. At the same time, the supporting element 31 may be positioned in such a way with respect to the cutting contour that the protective section 37 lies in the region traversed by the cutting beam. It is thereby possible firstly for the at least one underlying supporting point peak 26 to be protected, and secondly for both the product part and also the residual part 33 to be held in the edge region or close to the cutting contour, thereby assisting tilt-free mounting of the two parts. The positioning of the individual supporting elements 31 in the present geometry of the product part is merely exemplary.

After a machining program has been run through in its entirety, the supporting elements 31 can be raised or removed from the rest elements 22. The loading and unloading of such supporting elements 31 may preferably take place by means of handling devices 35, such as for example by means of single-axis or multi-axis linear axis systems or robots, which are used for example for the loading and unloading of the workpiece rest 14, or by means of a linear axis system in the machining machine 16. Similarly, manual loading may also take place. The positioning of the supporting elements 31 may be assisted by means of an external display unit 36, for example a data projector. Said display unit 36 is provided for example on the housing 17 of the machining system 11 and projects the individual loading positions of the supporting elements 31 onto the rest element(s) 22 of the workpiece rest 14.

An alternative embodiment, which is not illustrated in any more detail, of the supporting elements 31 as per FIGS. 1 to 4c provides that only rest surfaces 38, 39 for product parts 32 or for residual parts 33 are provided. Furthermore, it may alternatively be provided that a rest surface 38 for the product part 32 and at least one rest surface 39 for the residual part 33 are provided on a supporting element at the same height. It is likewise possible for embodiments to be provided in which the product part 32, after having been cut out from the workpiece 19, is situated at a lower level than the residual part 33. The statements made above apply analogously here.

Figure 6:
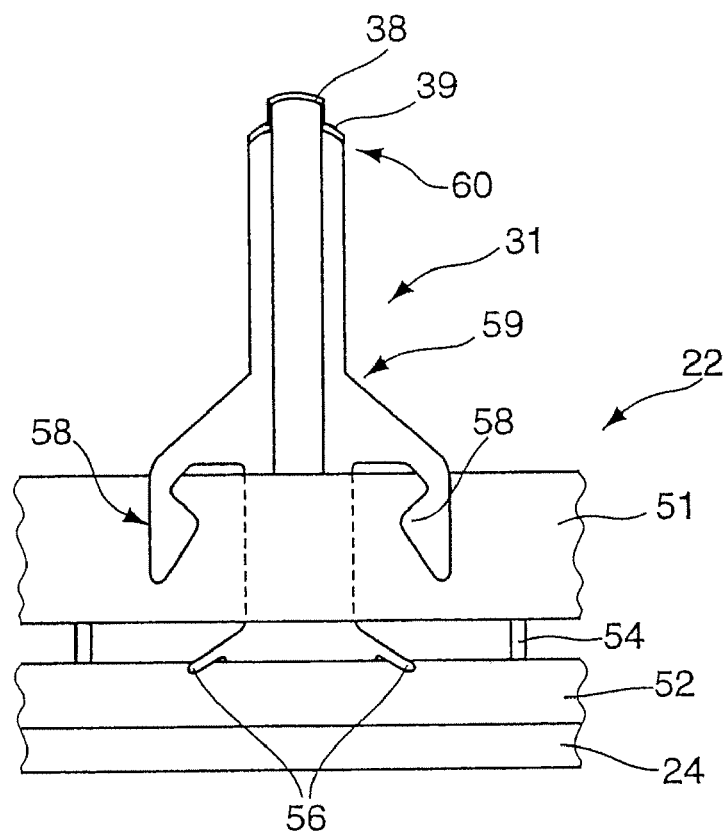
FIG. 6 is a perspective illustration of an alternative embodiment of the supporting element.
Figure 7:
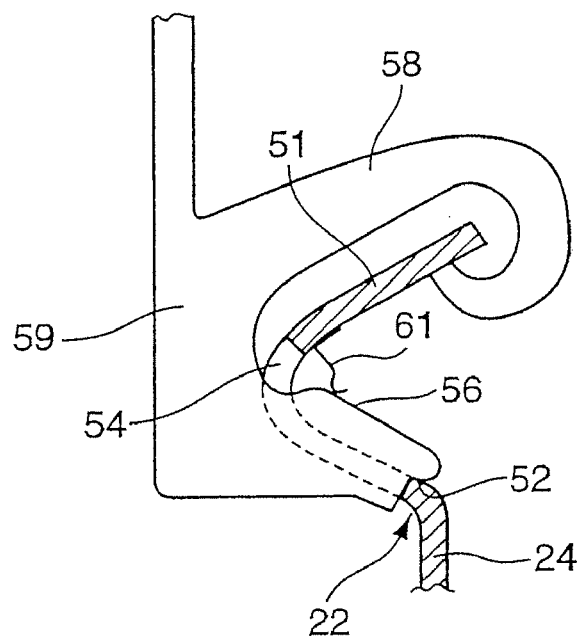
FIG. 7 shows a schematic side view of the supporting element as per FIG. 6.

FIGS. 6 and 7 illustrate an alternative embodiment of a supporting element 31 and of a rest element 22. The rest element 22 comprises a protective strip which is provided above a retaining strip 52 which is arranged for example in a V-shape with respect to the protective strip 51. The retaining strip 52 merges into a preferably vertically aligned rest strip 24 which is fastened to the frame 21 of the workpiece rest 14. Cutouts 54 are provided between the retaining strip 52 and the protective strip 51. Legs 56 of the supporting element 31 engage on and into said cutouts 54. Furthermore, the supporting element 31 is fixed by means of arms 58 which engage on or bear against an underside of the protective strip 51. By means of said design of the rest element and arrangement of the supporting element 31, it is ensured that the rest surfaces or contact surfaces for the legs 56 and arms 58 are protected from contamination, since said rest surfaces or contact surfaces are situated below the protective strip 51. This permits a precise arrangement and alignment of the supporting elements 31 even after multiple use of said rest elements 22. The inclination of the protective strip 51 also has the advantage that beam reflections and material spatter are deflected away from the cutting gap, such that an underside of the product part has a high level of quality.

The legs 56 and arms 58 are connected to one another by means of a support section 59, with a rest surface 38 for the product part 32 being provided on a head part 60 of the support section 59. In the exemplary embodiment illustrated in FIG. 6, a rest surface 39 for the residual part 33 is provided adjacent to the rest surface 38. An alternative embodiment provides that the supporting element 31 is designed as a product-part supporting element only having one or more rest surfaces 38, and as a residual-part supporting element only having one or more rest surfaces 39.

The supporting element 31 is formed as a sheet-metal part. Firstly, the contour is punched or cut and a V-shaped arrangement of the supporting element 31 is subsequently formed in a bending process. A stiffening of the support section 59, which has at least the rest surface 38, is obtained in this way.

In FIG. 7, a spring element 61 is provided on an underside of the protective strip 51, which spring element fixes the supporting element 31 in its retaining position on the rest element 22, and in particular fixes the legs 56 on the retaining strip 52 so as to at least partially engage behind the latter.

The spring element 61 as per FIG. 7 may be designed as a spring element which is continuous along the protective strip 51. Alternatively, further designs may be obtained in order to obtain a clamping action, such as for example by means of a type of eccentric shaft or a clamping plate or a form-fitting connection which, after the complete positioning of the supporting element 31, effects a clamping action.

The rest surface 38 of the supporting element 31 is provided outside or eccentrically with respect to the engagement points of the arms 58 and legs 56. In this way, the position of the supporting element 31 is stabilized, and tilting is prevented, when a product part and residual part 32, 33 are resting thereon.

The supporting elements 31 according to the above embodiments can be formed from different materials, thereby permitting an adaptation to the material of the workpiece to be machined.

All of the features described above may be combined with one another in any desired manner.

A number of embodiments of the invention have been described. Nevertheless, it will be understood that various modifications may be made without departing from the spirit and scope of the invention. Accordingly, other embodiments are within the scope of the following claims.

What is claimed is:

1. A workpiece rest for supporting a workpiece in a machining system that machines the workpiece using a cutting beam, the workpiece rest comprising:
   a frame,
   a plurality of rest elements arranged horizontally and adjacent to one another in the frame and each rest element comprising a plurality of supporting point peaks, and
   one or more supporting elements attached to at least one of the rest elements so as to support the workpiece;
   wherein the supporting element has a U-shaped cross section that during use is open in the downward direction, the supporting element is pluggable onto the rest element, and
   the supporting element covers at least one of the supporting point peaks provided on the rest element.

2. The workpiece rest as claimed in claim 1, wherein the one or more supporting elements are movable along the rest elements.

3. The workpiece rest as claimed in claim 1, wherein each of the rest elements has one or more rectilinear rest sections or a corrugated or sawtooth-shaped structure to which the supporting element is fixedly attached.

4. The workpiece rest as claimed in claim 1, wherein at least one of the supporting elements has at least one rest peak or rest surface for a product part and is designed as a product-part supporting element, and at least one other of the supporting elements has at least one rest peak or rest surface for a residual part and is designed as a residual-part supporting element, wherein a contact surface of the product part is provided at a different level than a contact surface of the residual part.

5. The workpiece rest as claimed in claim 4, wherein the contact surface of the product part is provided at a higher level than the contact surface of the residual part.

6. The workpiece rest as claimed in claim 4, wherein a height difference between the rest peak or surface of the product part and the rest peak or surface of the residual part is greater than a thickness of the workpiece.

7. The workpiece rest as claimed in claim 4, wherein the rest peak or surface for the product part or the rest peak or surface for the residual part is electrically insulating.

8. The workpiece rest as claimed in claim 1, wherein the supporting element has a rest peak or surface for a product part and a rest peak or surface for a residual part, wherein the rest peak or surface of the product part is provided at a different level than a level of the rest peak or surface of the residual part.

9. The workpiece rest as claimed in claim 1, wherein the supporting element is a unitary sheet-metal part.

10. The workpiece rest as claimed in claim 1, wherein the supporting element rests on at least one supporting point peak.

11. The workpiece rest as claimed in claim 1, wherein limbs of the supporting element bear against side surfaces of the rest element.

\* \* \* \* \*

UNITED STATES PATENT AND TRADEMARK OFFICE
CERTIFICATE OF CORRECTION

| | |
|---|---|
| PATENT NO. | : 8,172,211 B2 |
| APPLICATION NO. | : 12/276557 |
| DATED | : May 8, 2012 |
| INVENTOR(S) | : Friedrich Kilian |

It is certified that error appears in the above-identified patent and that said Letters Patent is hereby corrected as shown below:

Cover Page, Column 2, item (74), delete "Ricardson" and insert --Richardson--.

Signed and Sealed this
Thirty-first Day of July, 2012

David J. Kappos
*Director of the United States Patent and Trademark Office*